US012638957B2

(12) United States Patent      (10) Patent No.:   US 12,638,957 B2

Kim et al.                 (45) Date of Patent:     May 26, 2026

(54) COMMUNICATION SYSTEM USING USER INTERFACES FOR AUTOMATIC INSTANT MESSENGER CHAT SUMMARY GENERATION

(71) Applicant: KAKAO CORP., Jeju-si (KR)

(72) Inventors: Yong Yeon Kim, Seongnam-si (KR); Min Yoo, Seongnam-si (KR); Hyun Seok Yoo, Seongnam-si (KR)

(73) Assignee: KAKAO CORP., Jeju-Si (KR)

( * ) Notice: Subject to any disclaimer, the term of this patent is extended or adjusted under 35 U.S.C. 154(b) by 218 days.

(21) Appl. No.: 18/528,006

(22) Filed: Dec. 4, 2023

(65) Prior Publication Data

US 2024/0184424 A1     Jun. 6, 2024

(30) Foreign Application Priority Data

Dec. 6, 2022    (KR) ........................ 10-2022-0168953

(51) Int. Cl.
    *G06F 3/0482*       (2013.01)
    *H04L 12/18*        (2006.01)

(52) U.S. Cl.
    CPC ........ *G06F 3/0482* (2013.01); *H04L 12/1813* (2013.01)

(58) Field of Classification Search
    CPC ............... G06F 3/0482; G06F 3/04817; H04L 12/1813; H04L 51/04; H04L 51/046; H04L 51/10; H04L 51/212; G06Q 50/50
    See application file for complete search history.

(56) References Cited

U.S. PATENT DOCUMENTS

| | | | |
|---|---|---|---|
| 2014/0047358 A1* | 2/2014 | Park ........................ | H04L 51/04 |
| | | | 715/758 |
| 2017/0285885 A1* | 10/2017 | Henderson .............. | H04L 51/04 |
| 2018/0192260 A1* | 7/2018 | Lee ........................ | H04W 4/12 |
| 2020/0169426 A1* | 5/2020 | Park ........................ | H04L 51/02 |
| 2024/0007424 A1* | 1/2024 | Kim ................... | H04M 1/7243 |

FOREIGN PATENT DOCUMENTS

| | | |
|---|---|---|
| KR | 10-2014-0014681 A | 2/2014 |
| KR | 10-2017-0132592 A | 12/2017 |
| KR | 10-2020-0060241 A | 5/2020 |
| KR | 10-2020-0131058 A | 11/2020 |

OTHER PUBLICATIONS

Mar. 5, 2025 (KR) Office Action—App. No. 10-2022-0168953, with English translation, 12 pages.

* cited by examiner

*Primary Examiner* — Cao H Nguyen

(74) *Attorney, Agent, or Firm* — Banner & Witcoff, Ltd.

(57) ABSTRACT

A communication system using user interfaces for executing the instant messenger is provided. The system receives, via a network, data corresponding to at least one chat room; displays, based on the data and in a user interface of the instant messenger application, a chat room list; in response to receiving, via the user interface, a user input that indicates focus on a displayed portion of a first chat room, displays, via the user interface, chat room information that comprises metadata corresponding to the first chat room; and based on a determination that a focusing time for the displayed portion of the first chat room satisfies a threshold: displays, via the user interface and during display of the chat room information, a chat preview window corresponding to the first chat room; and displays, in the chat preview window, at least one chat communication occurred in the first chat room.

20 Claims, 11 Drawing Sheets

301

501

701

702

720

730

740

COMMUNICATION SYSTEM USING USER INTERFACES FOR AUTOMATIC INSTANT MESSENGER CHAT SUMMARY GENERATION

CROSS-REFERENCE TO RELATED APPLICATION

This application claims priority to and the benefit of Korean Patent Application No. 10-2022-0168953, filed on Dec. 6, 2022, in the Korean Intellectual Property Office, the entire disclosure of which is incorporated herein by reference for all purposes.

BACKGROUND

With the development of mobile smart devices, use of an online platform service to communicate with other users via a network has increased. The online platform service for interaction with other users may include, as representative examples, a social networking service (SNS), which is an online platform for generating and consolidating social relationships through communication among users, information sharing, and expansion of personal connections, and an instant messaging service (IMS), which is an online platform for real-time content communication between two or more users. With the increase of communication through mobile devices, the online platform service supports a multilateral group chat, a multilateral group video chat, and other various types of communication methods as well as a one-on-one chat with other users.

SUMMARY

One or more aspects of the present disclosure provide interfacing technology for an instant messenger that provides a chat room list in which participation may be requested and that provides a preview window of a chat message through the chat room list.

A method and apparatus may provide an instant messaging service using one or more user interfaces associated with automatic instant messenger chat generation. User interfaces of the executed messenger application and/or user interfaces of the chatroom interface may be improved and the communication interface associated with the automatic instant messenger chat generation may be improved, for example, by identifying a focusing time for one or more chat room items and/or one or more chat rooms.

However, the technical aspects are not limited to the aforementioned aspects, and other technical aspects may be present.

An apparatus configured to execute an instant messenger application and automatically generate previews of chat rooms via the instant messenger application may comprise: a display configured to receive at least one user input: a communication interface; one or more processors: and memory storing instructions that, when executed by the one or more processors, cause the apparatus to: receive, by the apparatus executing the instant messenger application and from a server via a network, data corresponding to at least one chat room: display, based on the data and in a user interface of the instant messenger application, a chat room list comprising an indication of the at least one chat room; in response to receiving, via the user interface, a user input that indicates focus on a displayed portion of a first chat room of the at least one chat room, display, via the user interface, chat room information that comprises metadata corresponding to the first chat room: and based on a determination that a focusing time for the displayed portion of the first chat room satisfies a threshold: display, via the user interface and during display of the chat room information, a chat preview window corresponding to the first chat room: and display, in the chat preview window, at least one chat communication occurred in the first chat room.

The instructions, when executed by the one or more processors, may further cause the apparatus to: in response to receiving, via the user interface, a second user input that indicates focus on a portion of a second chat room, display, via the user interface, second chat room information corresponding to the second chat room.

The instructions, when executed by the one or more processors, may cause the apparatus to display the at least one chat communication by: determining a preset number of chat messages among chat messages communicated in the first chat room; and displaying, in the chat preview window, the preset number of chat messages.

The instructions, when executed by the one or more processors, may cause the apparatus to display the at least one chat communication by: determining whether the at least one chat communication is approved for display in the chat preview window; and based on a determination that the at least one chat communication is approved for display in the chat preview window, displaying the at least one chat communication in the chat preview window.

The instructions, when executed by the one or more processors, may cause the apparatus to display the at least one chat communication by causing the apparatus to update display, in the user interface, of the at least one chat communication based on one or more of: transmission and reception of data in the first chat room: a change in a preview setting of the first chat room; or a determination that a predetermined time interval has elapsed.

The instructions, when executed by the one or more processors, may cause the apparatus to display the at least one chat communication by: displaying at least one chat message based on a content type of the at least one chat communication.

The instructions, when executed by the one or more processors, may cause the apparatus to display the at least one chat communication by displaying one or more of: a speech bubble corresponding to the at least one chat communication when a content type of the at least one chat communication is a text type: a speech bubble indicating a deleted message when the content type of the at least one chat communication is a deleted message type: or an icon corresponding to the at least one chat communication when the content type of the at least one chat communication is a media file type.

The instructions, when executed by the one or more processors, may cause the apparatus to display the at least one chat communication by displaying, via the user interface, one or more of: profile information of a user who sent the at least one chat communication: or notice information of the first chat room.

The chat room information may comprise one or more of: name information of the first chat room, introduction information of the first chat room, notice information of the first chat room, participant information of the first chat room, or chatbot information of the first chat room.

The instructions, when executed by the one or more processors, may cause the apparatus to display the at least one chat communication by: preventing display, in the user interface, of a second chat message based on a determination that a preview restriction of the second chat message is set.

The instructions, when executed by the one or more processors, may cause the apparatus to: after displaying the at least one chat communication in the chat preview window, display, based on the focusing time for the displayed portion of the first chat room satisfying a second threshold, second information corresponding to the first chat room, and wherein the second information comprises one or more of: a speech bubble: a link: an interfacing object; information associated with a media file; an emoticon; or an icon.

An apparatus configured to automatically generate iterative previews of chat rooms via an instant messenger application may comprise: a display configured to receive at least one user input: a communication interface: one or more processors: and memory storing instructions that, when executed by the one or more processors, cause the apparatus to: receive, via the instant messenger application, data corresponding to at least one chat room: display, based on the data and in a user interface of the instant messenger application, a chat room list comprising an indication of the at least one chat room; identify a first chat room in the chat room list by receiving, via the user interface, a user input that indicates focus on a displayed portion of the first chat room: and cause iterative output of information corresponding to the first chat room by: displaying, in the user interface and based on a first duration of the user input corresponding to the displayed portion of the first chat room satisfying a first threshold, first information corresponding to the first chat room; and displaying, after displaying the first information, in the user interface, and based on a second duration of the user input corresponding to the displayed portion of the first chat room satisfying a second threshold, second information corresponding to the first chat room.

The second threshold may be a value greater than the first threshold.

An apparatus configured to automatically generate previews of content shared in chat rooms via an instant messenger application may comprise: a display configured to receive at least one user input: a communication interface: one or more processors: and memory storing instructions that, when executed by the one or more processors, cause the apparatus to: receive, via the instant messenger application, data corresponding to at least one chat room: display, based on the data and in a user interface of the instant messenger application, a chat room list comprising an indication of the at least one chat room: in response to receiving, via the user interface, a user input that indicates focus on a displayed portion of a first chat room of the at least one chat room, display, via the user interface, chat room information that comprises metadata corresponding to the first chat room: and based on a determination that a focusing time for the displayed portion of the first chat room satisfies a threshold: determine a content type of a chat communication occurred in the first chat room; and in a chat preview window, corresponding to the first chat room, of the user interface, display, based on the content type of the chat communication, at least one chat message associated with the chat communication.

A method for automatically generating previews of chat rooms via an instant messenger application may comprise: receiving, by a computing device executing the instant messenger application and from a server via a network, data corresponding to at least one chat room: displaying, by the computing device, based on the data, and in a user interface of the instant messenger application, a chat room list comprising an indication of the at least one chat room: in response to receiving, by the computing device and via the user interface, a user input that indicates focus on a displayed portion of a first chat room of the at least one chat room, displaying, via the user interface, chat room information that comprises metadata corresponding to the first chat room; and based on a determination that a focusing time for the displayed portion of the first chat room satisfies a threshold: displaying, by the computing device, via the user interface, and during display of the chat room information, a chat preview window corresponding to the first chat room; and displaying, by the computing device and in the chat preview window, at least one chat communication occurred in the first chat room.

The method may further comprise: in response to receiving, via the user interface, a second user input that indicates focus on a portion of a second chat room, displaying, via the user interface, second chat room information corresponding to the second chat room.

The displaying the at least one chat communication may comprise: determining a preset number of chat messages among chat messages communicated in the first chat room; and displaying, in the chat preview window, the preset number of chat messages.

The displaying the at least one chat communication may comprise: determining whether the at least one chat communication is approved for display in the chat preview window: and based on a determination that the at least one chat communication is approved for display in the chat preview window, displaying the at least one chat communication in the chat preview window.

The displaying the at least one chat communication may comprise updating display, in the user interface, of the at least one chat communication based on one or more of: transmission and reception of data in the first chat room; a change in a preview setting of the first chat room; or a determination that a predetermined time interval has elapsed.

The displaying the at least one chat communication may comprise: displaying at least one chat message based on a content type of the at least one chat communication.

The displaying the at least one chat communication may comprise one or more of: displaying a speech bubble corresponding to the at least one chat communication when a content type of the at least one chat communication is a text type: displaying a speech bubble indicating a deleted message when the content type of the at least one chat communication is a deleted message type: or displaying an icon corresponding to the at least one chat communication when the content type of the at least one chat communication is a media file type.

The displaying the at least one chat communication may comprise: displaying, via the user interface, profile information of a user who sent the at least one chat communication; or displaying, via the user interface, notice information of the first chat room.

The chat room information may comprise one or more of: name information of the first chat room, introduction information of the first chat room, notice information of the first chat room, participant information of the first chat room, or chatbot information of the first chat room.

The displaying the at least one chat communication may comprise: preventing display, in the user interface, of a second chat message based on a determination that a preview restriction of the second chat message is set.

The method may further comprise: after displaying the at least one chat communication in the chat preview window, displaying, based on the focusing time for the displayed portion of the first chat room satisfying a second threshold, second information corresponding to the first chat room, and wherein the second information comprises one or more of: a speech bubble; a link: an interfacing object; information associated with a media file: an emoticon; or an icon.

A method for automatically generating iterative previews of chat rooms via an instant messenger application may comprise: receiving, by a computing device executing the instant messenger application and from a server via a network, data corresponding to at least one chat room; displaying, by the computing device, based on the data, and in a user interface of the instant messenger application, a chat room list comprising an indication of the at least one chat room: identifying a first chat room in the chat room list by receiving, by the computing device and via the user interface, a user input that indicates focus on a displayed portion of the first chat room; and causing iterative output of information corresponding to the first chat room by: displaying, in the user interface and based on a first duration of the user input corresponding to the displayed portion of the first chat room satisfying a first threshold, first information corresponding to the first chat room: and displaying, after displaying the first information, in the user interface, and based on a second duration of the user input corresponding to the displayed portion of the first chat room satisfying a second threshold, second information corresponding to the first chat room.

The second threshold may be a value greater than the first threshold.

The first information may comprise one or more of: name information of the first chat room, introduction information of the first chat room, notice information of the first chat room, participant information of the first chat room, chatbot information of the first chat room, or information corresponding to a chat message transmitted and received in the first chat room.

A method for automatically generating previews of content shared in chat rooms via an instant messenger application may comprise: receiving, by a computing device executing the instant messenger application and from a server via a network, data corresponding to at least one chat room; displaying, by the computing device, based on the data, and in a user interface of the instant messenger application, a chat room list comprising an indication of the at least one chat room: in response to receiving, by the computing device and via the user interface, a user input that indicates focus on a displayed portion of a first chat room of the at least one chat room, displaying, via the user interface, chat room information that comprises metadata corresponding to the first chat room; and based on a determination that a focusing time for the displayed portion of the first chat room satisfies a threshold: determining a content type of a chat communication occurred in the first chat room; and in a chat preview window, corresponding to the first chat room, of the user interface, displaying, based on the content type of the chat communication, at least one chat message associated with the chat communication.

The displaying the at least one chat message may comprise one or more of: displaying a speech bubble corresponding to the at least one chat message when the content type of the at least one chat message is a text type: displaying a speech bubble indicating a deleted message when the content type of the at least one chat message is a deleted message type: and displaying an icon corresponding to the at least one chat message when the content type of the at least one chat message is a media file type.

A non-transitory computer-readable storage medium storing instructions that, when executed by a processor, cause the processor to perform the method described herein.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
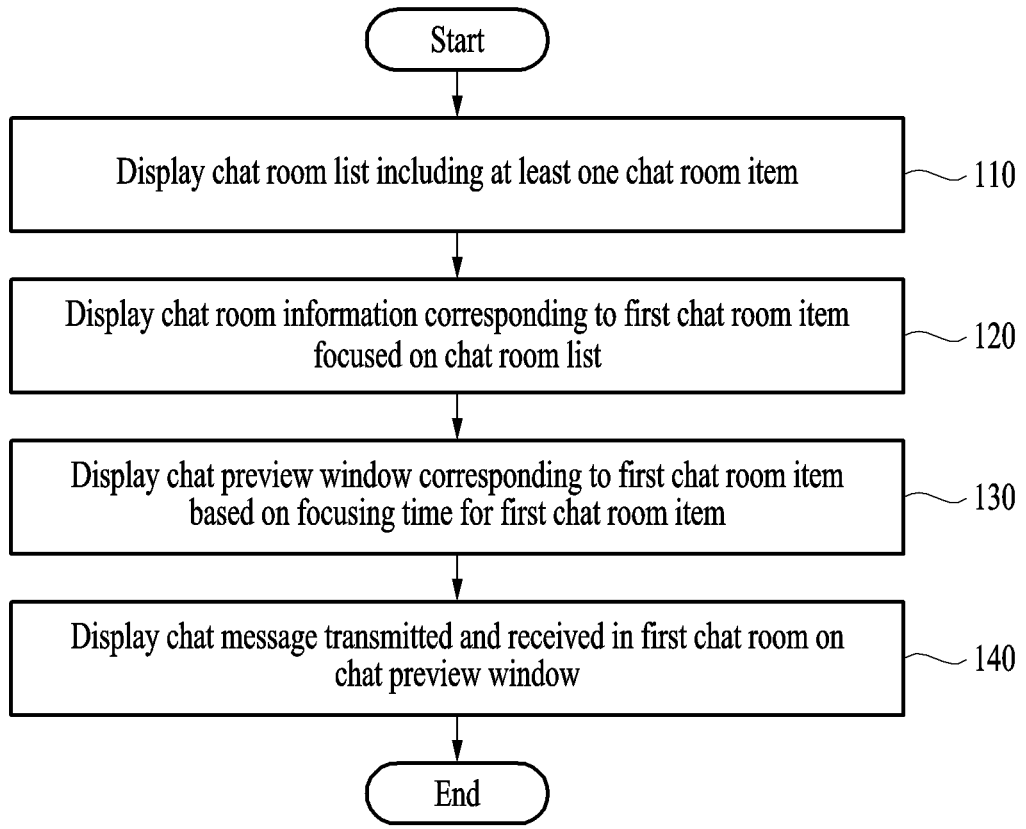
FIG. 1 is a flowchart illustrating an example operation method of an instant messenger.

The following detailed structural or functional description is provided as an example only and various alterations and modifications may be made to various features of the present disclosure. Here, examples are not construed as limited to the disclosure and should be understood to include all changes, equivalents, and replacements within the idea and the technical scope of the disclosure.

Although terms such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. It will be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Hereinafter, the embodiments are described in detail with reference to the accompanying drawings. When describing the embodiments with reference to the accompanying drawings, like reference numerals refer to like components and a repeated description related thereto is omitted.

As will be detailed further below, aspects described herein improve the functioning of computers by, among other things, improving the speed, efficiency, and user friendliness of instant messenger applications. Even chat rooms with relatively few numbers of users can comprise large quantities of chat messages and can move extremely quickly, meaning that it can be difficult for new users of a chat room to quickly identify whether a particular chat room would be of interest to them. For example, a user trying to investigate whether a public image-sharing chat room would be of interest to them might be forced to actually join the chat room and manually scroll through days' worth of different chat messages including images, which can be a time-consuming process that, in the aggregate, can waste a substantial quantity of computing resources (e.g., bandwidth, memory). To avoid such wasteful behavior and to make the process more efficient, aspects described herein provide a process whereby users might be provided with automatic information about chat rooms that previews some content in those chat rooms in a way that allows users to readily decide whether a particular chat room is of interest. For instance, rather than forcing the user to join an unknown chat room and scroll through days' worth of shared images, chat messages, and the like, the user might instead be provided with a quick collection of recent and/or interesting messages (e.g., recent images), metadata about the chat room, and the like. The result is a process that saves computing resources (as the user is not forced to join and manually browse the chat room as part of their evaluation of the chat room), saves user time, and provides a more satisfactory user experience.

As will become more apparent based on the disclosure below, aspects described herein also provide a technical improvement to computing devices because aspects described herein improve the receipt and output of data using computing devices. Many computing devices, such as smartphones and tablets, have limited (and, commonly, small) output devices, such as small display screens. Moreover, input mechanisms on those devices can be limited: often, such devices lack physical keyboards or the like. As a result, it can be important to receive and output data in a manner that accounts for limitations associated with such display screens and such input modalities. The improvements described herein provide such an improvement by not inundating users with unnecessary detail (e.g., all chat messages for a particular chat room at once) and instead process the data to provide pertinent data in an early and targeted manner. In this manner, users need not search for pertinent data themselves (which can be time-consuming, inaccurate, and difficult given input limitations) and are instead provided (despite the limited screen real estate) important data early and in an easily-readable format.

In turn, as also illustrated through the description below, aspects described herein are fundamentally rooted in instant messaging technology and the particularities of real-time communications. As such, aspects described herein could not be performed in the human mind and/or using pen and paper. For instance, the present disclosure relates to a process whereby users are provided information via particular computing elements (e.g., computing devices executing instant messenger applications with user interfaces) and regarding computer-implemented messaging systems (e.g., instant messenger application chat rooms and chat messages). Moreover, many of the problems addressed by the present disclosure (e.g., making the process of browsing chat rooms more efficient in a manner that saves time and bandwidth) are inherent to computing devices and are not analogous to any human activity.

FIG. 1 is a flowchart illustrating an operation method of an instant messenger.

The instant messenger may be an instant messenger application and/or an instant messenger web, which is installed in a user's terminal (e.g., a user terminal, such as a mobile phone, a tablet, a personal computer, etc.) and provides a function of transmitting and receiving instant messages among two or more participants including the user. The instant messenger may interoperate with one or more computing devices (e.g., a server). An instant messaging service may include a service that allows a plurality of users to chat in real time by transmitting text messages, voice messages, media files, and other instant messages through a network, such as wireless Internet or a wireless communication network, and services related thereto.

The server may interoperate with the instant messenger executed in the terminal for a user interface (UI), a function, an operation, or a service. An application may provide a UI to the terminal in which the application is installed. Via the UI provided by the application, the user's terminal may configure a screen, input data, transmit and receive data, store data, and/or perform other operations for the function of transmitting and receiving instant messages.

The user's terminal may refer to one of electronic devices, such as a computer, a portable computer, a wireless phone, a mobile phone, a smartphone, a personalized digital assistant (PDA), a web tablet, and any device that includes a display and that may install and execute an application (e.g., a computer program, a software application program, etc.).

The user may use the instant messaging service provided by the server by executing the instant messenger on the terminal. The user may generate a user account by subscribing to the instant messaging service through the instant messenger. The user may use the instant messaging service through a terminal of a user account subscribing to the instant messaging service. The terminal of the user account subscribing to the instant messaging service may refer to a terminal logging in with the user account subscribing to the instant messaging service.

The operation method of an instant messenger may include operation 110 of displaying a chat room list including at least one chat room item. The chat room may be a chat room generated by executing the instant messaging service and may include, for example, a chat room generated by the user's request to open a chat room received by the server through the instant messenger. The chat room may be a virtual space in which one or more user accounts participate for transmitting and receiving chat messages. The chat room may include a self chat room in which one user account participates, a one-on-one chat room in which two user accounts participate, a group chat room in which three or more user accounts participate, or a chat room in which at least one user account and at least one chatbot participate. The chat room may include a chat room in which a user having a user account may participate through an invitation of a user account that requested the opening of the chat room or a user account that is already participating in the chat room, and a chat room in which a user having a user account may participate through a link.

An identifier corresponding to a participating user account may be exposed through a chat room. The identifier corresponding to a user account may include profile information (e.g., a profile name, a profile photo, or real name information, etc.) of the user account. The profile information of the user account may include real name information of the user account registered with the instant messaging service. The real name information may include at least one of the user's name, ID, or profile photo. For example, the identifier corresponding to the user account may include temporary profile information set by the user when participating in the chat room. The temporary profile information may include at least one of a nickname, an alias, or a photo that is randomly set to participate in the chat room.

A chat room list may be displayed on a terminal executing the instant messenger. The chat room list may include an arbitrary number of chat room items. Each chat room item may correspond to one of a plurality of chat rooms generated on the server. A terminal may receive information on a chat room from the server. For example, the terminal may generate and display a chat room list based on the information on a chat room. For example, the information on a chat room may include a chat room list. In other words, a chat room list including at least one chat room item may be received from the server. For example, the chat room list may include "n" randomly selected chat room items. For example, the chat room list may include a chat room item related to the user of the terminal. The user of the terminal may refer to a user of a user account logging in to the instant messenger executed on the terminal. A chat room item related to the user may include a chat room item determined to be highly related to information (e.g., age, gender, residence, occupation, hobby, field of interest, etc.) registered in the user account, and a chat room item similar to a chat room selected by the user as a chat room of interest, and the like. For example, the chat room list may include a chat room item corresponding to a search word (e.g., a search keyword) received via a user interface of the terminal. The chat room item corresponding to the search word may include a chat room item that includes the entered search word or a word similar to the search word in the chat room information. For example, a search word may include a hashtag and, when a hashtag is entered as a search word, a chat room item corresponding to the entered hashtag.

The operation method of an instant messenger may include operation 120 of displaying chat room information corresponding to a first chat room item focused on the chat room list.

A chat room item included in the chat room list may be focused by the user. A focused chat room item may refer to a chat room item that is displayed as a focus on the display of the terminal among chat room items included in the chat room list. For example, the focused chat room item may include a chat room item being displayed on the display, a chat room item being displayed in the largest area among the chat room items being displayed on the display, or a chat room item being displayed in the center area of the display.

The focused chat room item may be changed by an input that moves focus. For example, when the chat room items included in the chat room list are arranged horizontally, the focused chat room item may be changed by a swipe input in the left or right direction. For example, when the chat room items included in the chat room list are arranged vertically, the focused chat room item may be changed by a swipe input in the up or down direction.

The first chat room item may be focused on the chat room list. When the first chat room item is focused, chat room information corresponding to the first chat room item may be displayed on the display of the terminal executing the instant messenger. The chat room information may be information indicating basic features of the chat room and may include, for example, at least one of name (or title) information, introduction information, notice information, participant information, or chatbot information of the chat room. The introduction information may include at least one of an introduction set in the chat room or a hashtag set in the chat room. The notice information may include a post registered as a notice set in the chat room. The participant information may include at least one of account information (e.g., profile name, nickname, etc.) of a user participating in the chat room, user account information set as the chat room host, and/or chat room generator information. The chatbot information may include information (e.g., the name of the chatbot, the function of the chatbot, etc.) indicating at least one chatbot activated in the chat room.

The operation method of an instant messenger may include displaying chat room information corresponding to a second chat room item in response to an input that moves focus to the second chat room item. For example, when the chat room items included in the chat room list are arranged horizontally, the focused chat room item may be changed to the next chat room item by a user input (e.g., by a swipe input in the right direction).

The chat room item may include an interfacing object for an entry request for the chat room. The entry request for the chat room may be transmitted to the server by an input selecting the interfacing object. When entry to the chat room is approved, the terminal logging in with the user account may be permitted to access the chat room.

The operation method of an instant messenger may include operation 130 of displaying a chat preview window corresponding to the first chat room item based on the focusing time for the first chat room item and operation 140 of displaying a chat message transmitted and received in the first chat room on the chat preview window. The chat preview window may be a window in which a chat message transmitted and received in the chat room is displayed and may be an interface for previewing the chat message transmitted and received in the chat room to a user who is not connected to the chat room.

Operation 130 of displaying a chat preview window may include comparing the focusing time for the first chat room item to a preset threshold value and displaying the chat preview window if the focusing time exceeds the threshold value. If the focusing time is less than or equal to the threshold value, the chat preview window may not be displayed.

The chat preview window may be displayed along with the chat room information. In an example, the area in which the chat room information is displayed and the area in which the chat preview window is displayed may be separate areas that do not overlap with each other. The chat preview window may be displayed replacing at least a portion of the chat room information. In this case, the area in which the chat preview window is displayed and the area in which chat room information is displayed may partially overlap with each other.

At least some of chat messages among chat messages transmitted and received in the first chat room may be displayed on the chat preview window.

Operation 140 of displaying a chat message may include displaying a preset number of recently transmitted and received chat messages among the chat messages transmitted and received in the first chat room. For example, chat messages transmitted and received in the first chat room from a determined point in time (e.g., a point in time when the chat preview window is displayed or when the first chat room item is focused) may be sequentially displayed on the chat preview window. For example, among the chat messages transmitted and received in the first chat room up to a specific point in time (e.g., a point in time when the chat preview window is displayed or when the first chat room item is focused), "n" chat messages transmitted and received at a time close to the point in time when the chat preview window is displayed may be sequentially displayed on the chat preview window.

The operation 140 of displaying a chat message may include displaying a chat message predetermined to be exposed through the chat preview window. For example, some chat messages that are selected by a participant of the first chat room among the chat messages transmitted and received in the first chat room may be determined to be exposed through the chat preview window. For example, among the chat messages transmitted and received in the first chat room, chat messages transmitted and received in a determined time section may be determined to be exposed through the chat preview window. The specific time section may be determined by the participant of the first chat room or by the server. For example, among the chat messages transmitted and received in the first chat room, chat messages including a predetermined keyword may be determined to be exposed through the chat preview window.

The operation 140 of displaying a chat message may include displaying profile information of a user who sent a chat message displayed on the chat preview window. The profile information of the user who sent the chat message may be displayed adjacent to the chat message so that the user who sent the chat message may be identified. Depending on a preview setting corresponding to the chat room, the profile information of the user may be randomly displayed. For example, unlike the profile information, which may be displayed in the chat room, of the user who sent the chat message, the chat preview window exposed to users who are not participants of the chat room may display profile information including a random profile photo and a random profile name.

The operation 140 of displaying a chat message may include updating a display of the chat message on the chat preview window based on transmission and reception of data in the first chat room. When a preset number of recently transmitted and received chat messages among the chat messages transmitted and received in the first chat room are displayed on the chat preview window, the chat messages displayed on the chat preview window may be updated as new chat messages are transmitted and received through the first chat room.

The operation 140 of displaying a chat message may include updating the display of the chat message on the chat preview window based on a change in a preview setting of the first chat room. For example, the display of the chat message on the chat preview window may be updated when a chat message determined by a participant of the chat room to be exposed through the chat preview window is changed. For example, when a chat message transmitted and received in a determined time section is determined to be exposed through the chat preview window, the display of the chat message on the chat preview window may be updated due to a change of the time section.

The operation 140 of displaying a chat message may include updating the display of the chat message on the chat preview window at determined intervals. Newly transmitted and received chat messages in the first chat room or a change in the preview setting of the first chat room may be monitored at determined intervals and, according to changes, the display of the chat message on the chat preview window may be updated.

The method of displaying a chat message may be determined according to a content type of the chat message. For example, the operation 140 of displaying a chat message may include displaying a speech bubble corresponding to the chat message when the content type of the chat message is a text type. For example, the operation 140 of displaying a chat message may include displaying a speech bubble indicating a deleted message when the content type of the chat message is a deleted message type. As an example, the operation 140 of displaying a chat message may include displaying an icon corresponding to the chat message when the content type of the chat message is a media file type. A media file may include various types of media or multimedia files, such as an image file, video file, and sound file. The icon may be a visual symbol that indicates the content type of the chat message. For example, when the media file is an image file, the icon may include a thumbnail of the image, and when the media file is a video file, the icon may include a thumbnail of the video.

The operation 140 of displaying a chat message may include restricting the display of the chat message when a preview restriction of the chat message is set. The chat message transmitted and received in the first chat room may not be exposed through the chat preview window.

The preview restriction of the chat message may be set by a determined user account of the chat room. For example, the preview restriction of the chat message may be set by a user account set as the chat room host, a user account participating in the chat room, or a user account of a terminal on which the chat preview window is displayed.

The preview restriction of the chat message may be set for each chat message. For example, if recently transmitted and received chat messages are displayed on the chat preview window, when the preview restriction is set for a determined chat message, the determined chat message may not be exposed on the chat preview window. For example, the preview restriction may be set for a chat message including a predetermined keyword.

The preview restriction may be set for a chat message of a determined content type. For example, the preview restriction may be set for a chat message of which the content type is not a text type. In an example, a text-type chat message may be exposed through the chat preview window, and a non-text-type chat message may not be exposed through the chat preview window.

The preview restriction for the chat message may be set for each user account that transmits a chat message. For example, if a user account sets a chat message sent by the user account not to be displayed on the chat preview window, the chat message sent by the user account may not be displayed on the chat preview window.

The preview restriction of the chat message may be set based on the characteristics of a user of the terminal on which the chat preview window is displayed. The characteristics of a user related to the preview restriction setting may include the age, region of residence, gender, activity restriction history, etc. of the user. For example, for the first chat room, the preview restriction of the chat message may be set on the terminal of a user of a determined age. When the first chat room is focused on the terminal of a user of the determined age, a chat message may not be exposed through the chat preview window of the first chat room. For example, the preview restriction may be set for all chat rooms on the terminal of a user with an activity restriction history. When a chat room is focused on the terminal of the user with an activity restriction history, a chat message may not be exposed through the chat preview window of the focused chat room.

Figure 2A:
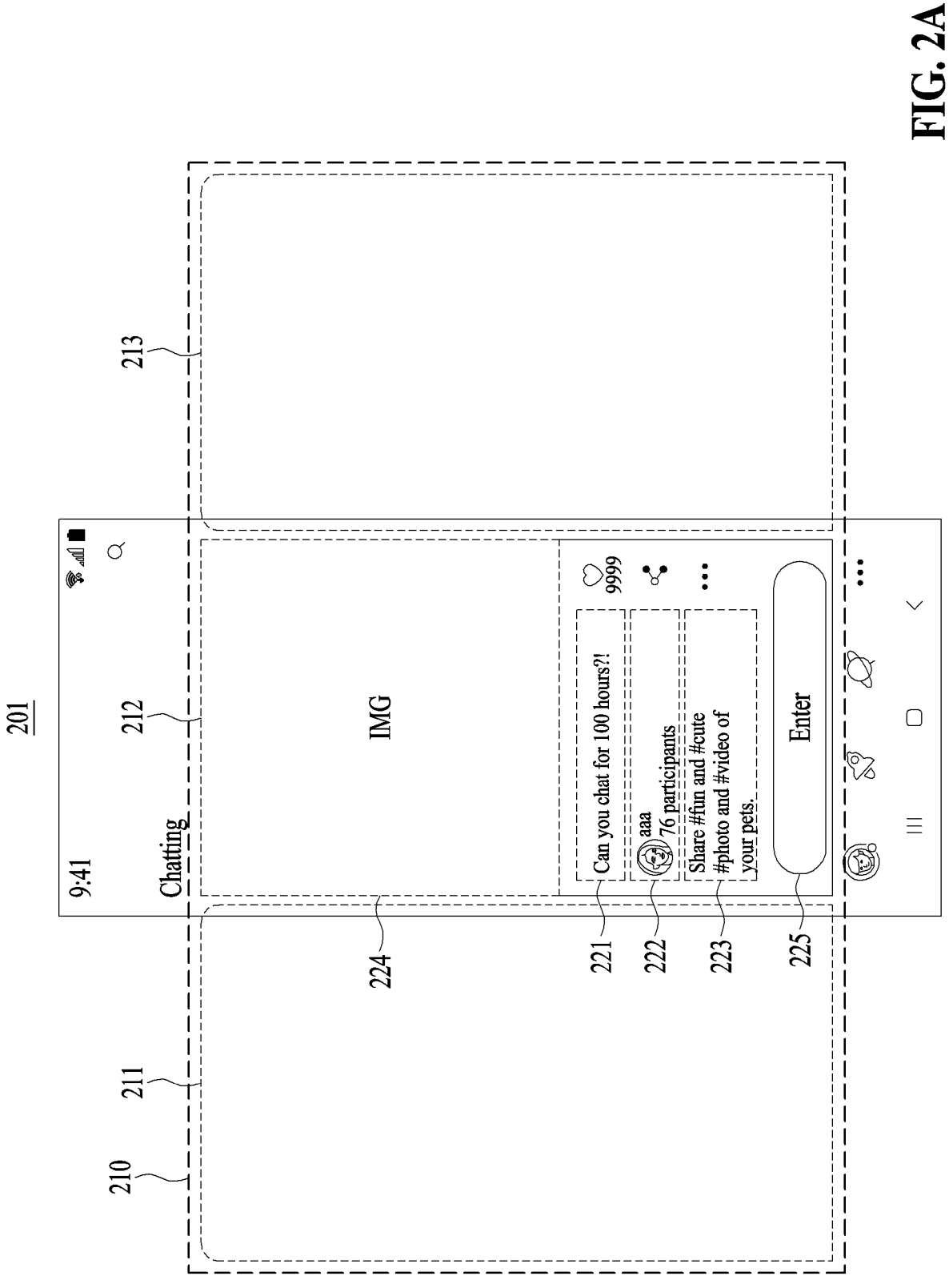
FIGS. 2A and 2B are diagrams illustrating an example screen of an instant messenger displayed on a terminal.
Figure 2B:
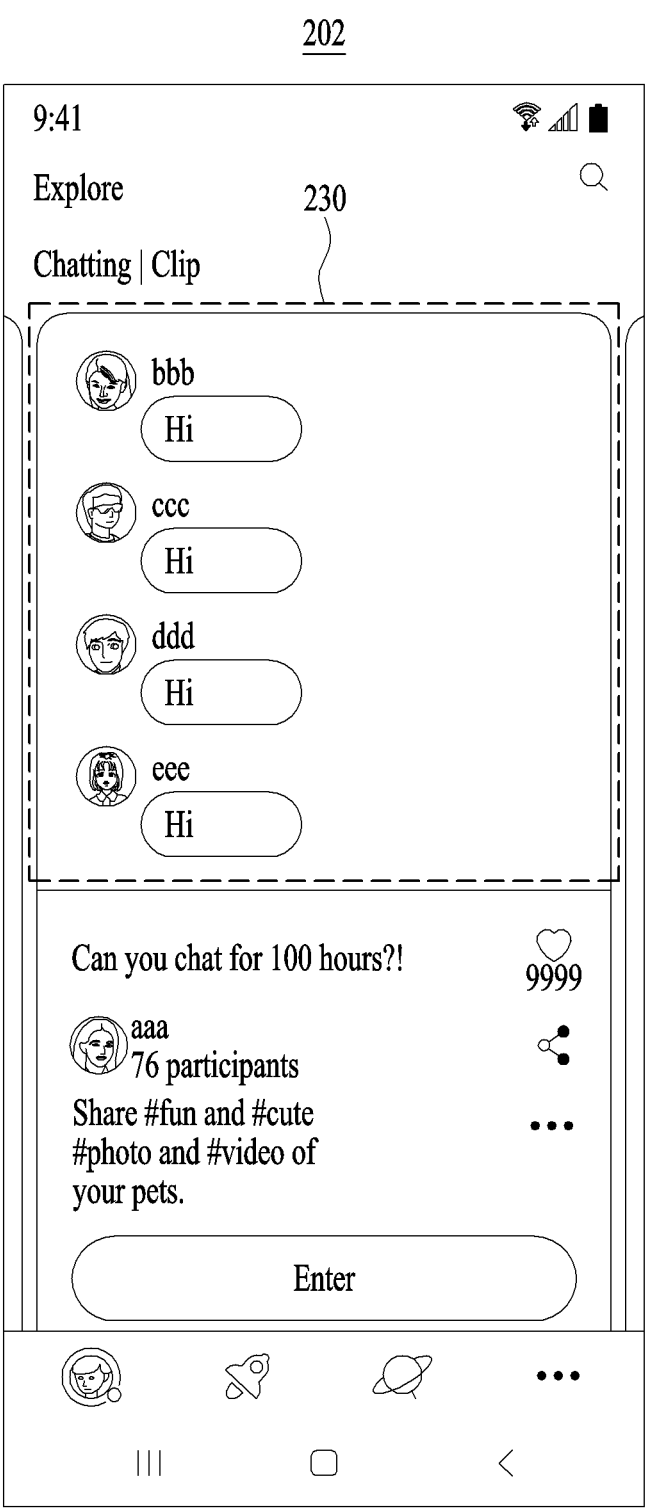

FIGS. 2A and 2B are diagrams illustrating a screen of an instant messenger displayed on a terminal.

Referring to a screen 201 of FIG. 2A, a chat room list 210 may be displayed through an interface (e.g., a user interface, a graphical user interface, etc.). The chat room list 210 may include at least one chat room item 211, 212, or 213.

For example, each chat room item 211, 212, or 213 included in the chat room list 210 may be displayed (e.g., in a card view including chat room information). Referring to the first chat room item 212, chat room information including an indicator 221 of a name of the chat room, an indicator 222 of participant information of the chat room, an indicator 223 of introduction information of the chat room (e.g., including hashtag(s) and/or other pieces of information indicating keywords or other introduction information of the chat room), and/or a background image 224 of the chat room may be displayed. The indicator 222 of participant information of the chat room may include profile information of the chat room host (or generator) and information indicating the number of participants of the chat room. The indicator 223 of introduction information of the chat room may include an introduction to the chat room and hashtag information.

For example, the first chat room item 212 may include an entry request button 225 to request participation in the corresponding chat room. By an input selecting the entry request button 225, a terminal may access the chat room corresponding to the first chat room item 212. The user account logging in to the terminal may be registered as a participant in the chat room corresponding to the first chat room item 212.

A focused chat room item may be determined among the plurality of chat room items 211, 212, and 213 included in the chat room list. For example, among the plurality of chat room items 211, 212, and 213, the first chat room item 212 that is output through the display may be identified as the focused chat room item.

The focused chat room item may be changed by an input requesting the output of another chat room item. For example, the input requesting the output of another chat room item may include a swipe input in a determined direction, an input to select a portion of a screen, an input to select a next button, and the like. For example, the focused chat room item may be changed from the first chat room item 212 to the next chat room item 213 of the first chat room item 212 by an input touching the right area of the screen or an input swiping the screen in the left direction. For example, the focused chat room item may be changed from the first chat room item 212 to the previous chat room item 211 of the first chat room item 212 by an input touching the left area of the screen or an input swiping the screen in the right direction. In at least some implementations, the plurality of chat room items 211, 212, and 213 may be chat room items of a same chat room and may display different portions and aspects of the same chat room. In at least some implementations, the previous chat room item 211, the first chat room item 212, and the next chat room item 213 may be chat room items of different chat rooms.

Unlike the illustration in the screen 201, a plurality of chat room items may be displayed on one screen (e.g., on a single screen or dual screens of a mobile terminal at the same time). In this case, the focused chat room item may be determined as an item displayed in the largest area, an item displayed in the center, or a selected item. Alternatively or additionally, one or more chat room items displayed on the screen 201 may be determined as focused chat room items. The focused chat room item may be displayed to be distinguishable from the other chat room items. For example, the display size, color, and visual special effect of a chat room item may be displayed such that the focused chat room item(s) may be differentiated from the other unfocused chat room items.

The chat preview window may be displayed according to the focusing time for the first chat room item 212. The chat preview window may correspond to an interface in which the chat message transmitted and received in the first chat room corresponding to the first chat room item 212 may be displayed. An example of a screen including the first chat room item 212 on which the chat preview window is displayed may be shown in FIG. 2B.

If the focusing time for a determined chat room item exceeds the threshold value, a chat preview window 230 corresponding to the chat room item may be displayed, as shown in a screen 202 of FIG. 2B. Chat messages transmitted and received in the corresponding chat room may be displayed on the chat preview window 230. At least some of the chat messages transmitted and received in the chat room before a user accesses the chat room may be exposed to a user who is not a participant of the chat room through the chat preview window 230.

The chat preview window 230 may be displayed in an entire or partial area of the chat room item. The chat preview window 230 may be displayed in a portion of an area in which chat room information is displayed. For example, as shown in the screen 202 of FIG. 2B, the chat preview window 230 may be displayed in an area in which the background image 224 of the chat room is displayed. The chat preview window 230 may be displayed (e.g., overlaid) on the background image 224 of the chat room. In another example, unlike what is shown in the screen 202 of FIG. 2B, the chat preview window 230 may be displayed in the entire area of the chat room item. For example, when the chat preview window 230 is displayed (e.g., overlaid) on the background image 224 of the chat room, the background image 224 of the chat room may be processed to be translucent.

At least some of the chat messages transmitted and received in the chat room may be displayed on the chat preview window 230. A chat message displayed on the chat preview window 230 may be a chat message recently transmitted and received in the chat room or a chat message predetermined (e.g., authorized by one or more chatroom participants) to be exposed through the chat preview window 230.

Figure 3A:
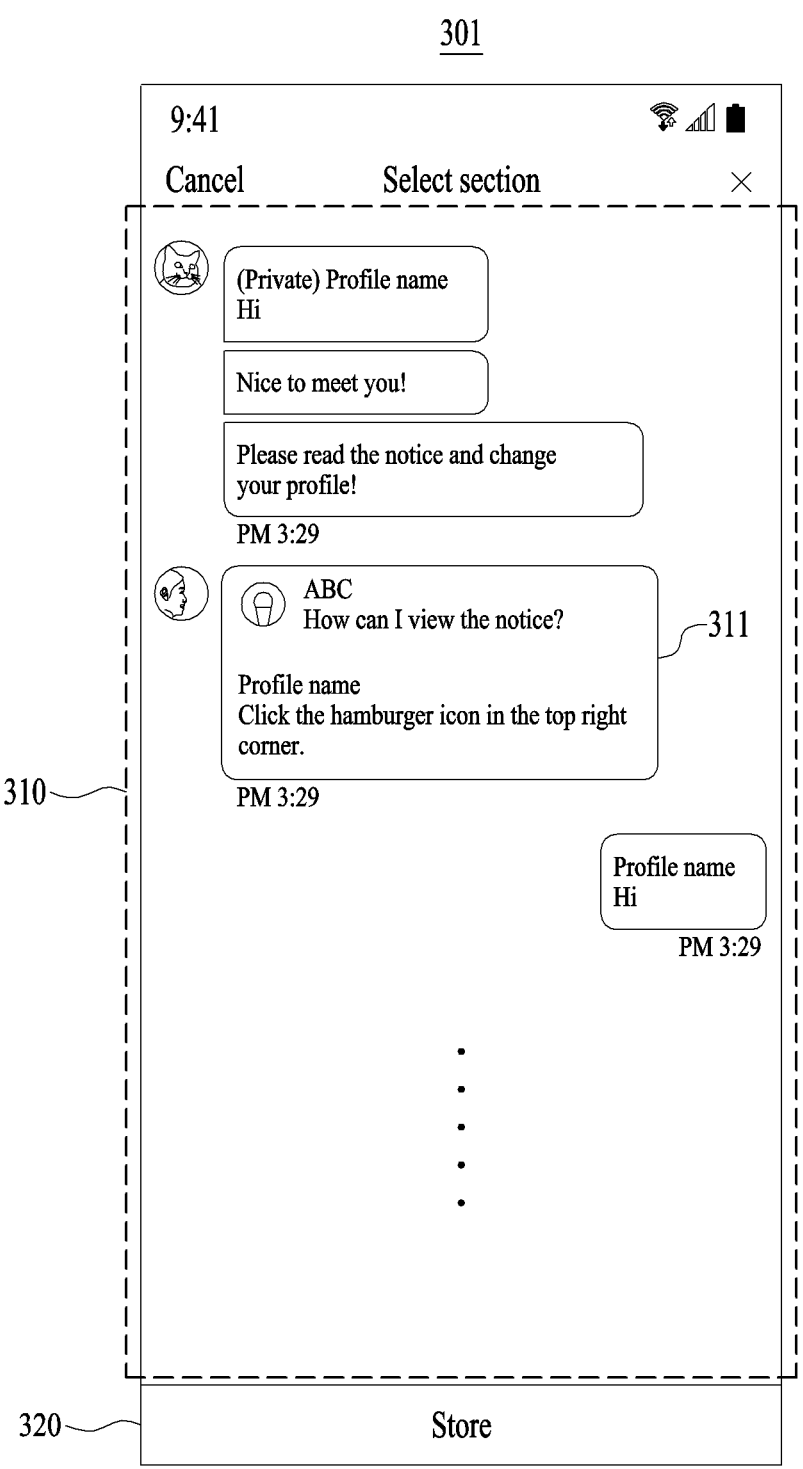
FIGS. 3A and 3B are diagrams illustrating an example method of determining a chat message to be exposed through a chat preview window on a terminal of a participant of a chat room.
Figure 3B:
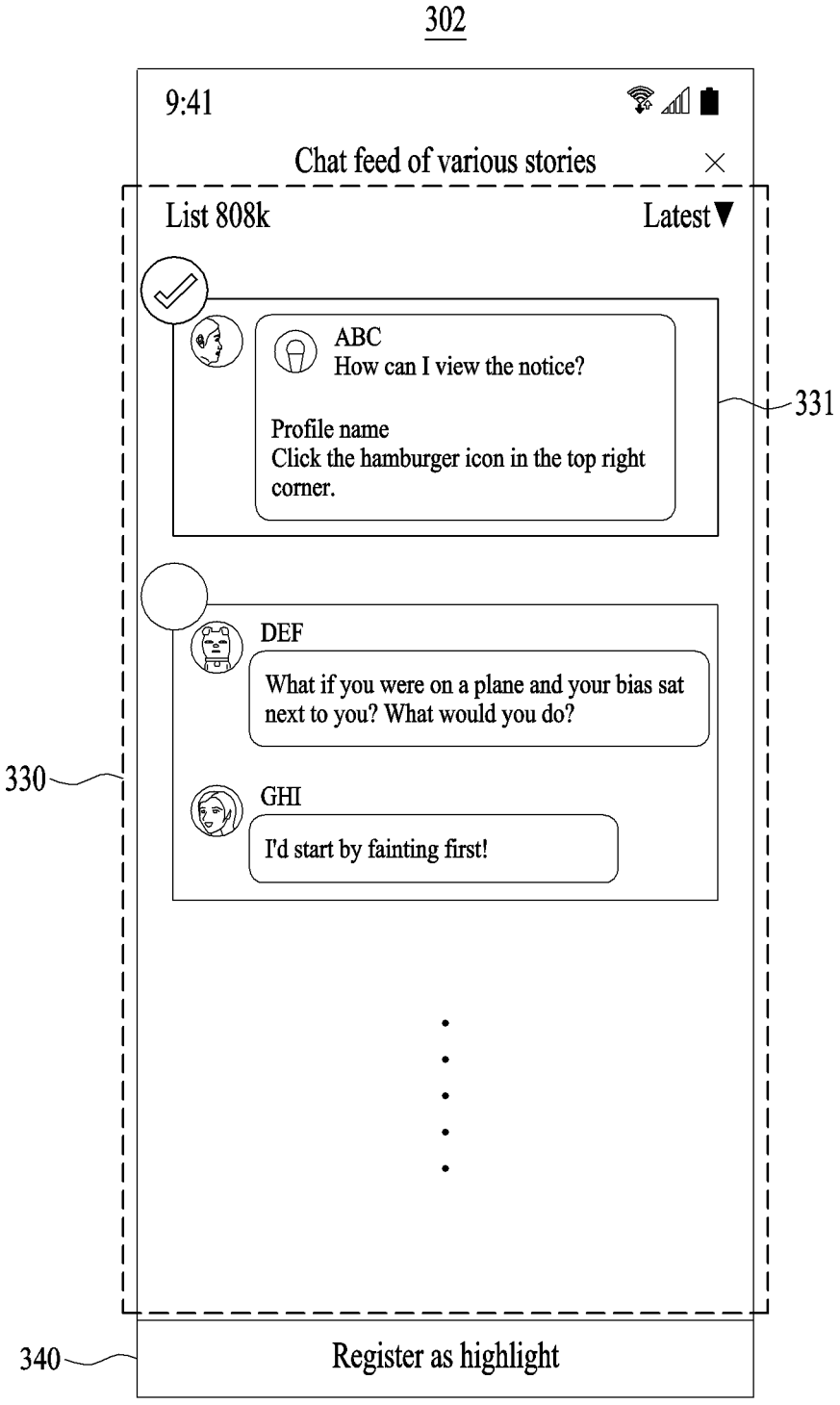

FIGS. 3A and 3B are diagrams illustrating a method of determining a chat message to be exposed through a chat preview window on a terminal of a participant of a chat room.

A screen 301 displayed on the terminal of the participant of the chat room shown in FIG. 3A may include a chat window 310 corresponding to the chat room. Chat messages transmitted and received in the chat room may be displayed on the chat window 310 in the order of transmission time. The participant of the chat room may select at least some of the chat messages transmitted and received in the chat room through the terminal as a chat message to be exposed through the chat preview window. For example, a chat message corresponding to a determined time section may be selected in the chat window 310 based on an input of a user received through the terminal. For example, the determined time section may be determined to include two selected chat messages and chat messages transmitted and received between the two selected chat messages. A selected chat message 311 may be stored in a storage space corresponding to the chat room. For example, the selected chat message 311 may be stored in the storage space by an input selecting a storage request button 320.

Referring to a screen 302 of FIG. 3B, a stored chat message list 330 corresponding to the chat room may be provided. At least some of the chat messages stored in the stored chat message list 330 may be determined as the chat message to be exposed through the chat preview window. For example, a chat message 331 selected by an input selecting the chat message 331 and selecting a button 340 may be determined as the chat message to be exposed through the chat preview window.

Figure 4:
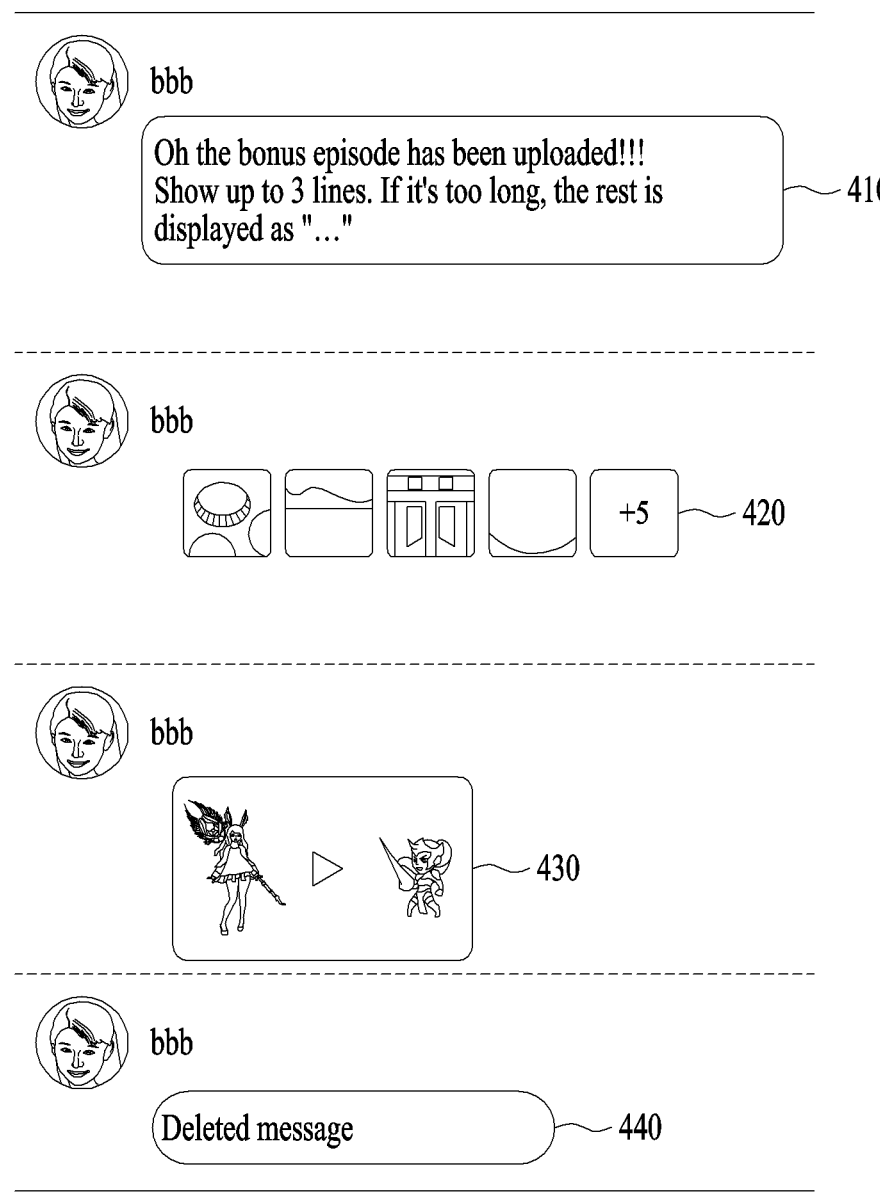
FIG. 4 is a diagram illustrating an example method of displaying a chat message according to a content type.

FIG. 4 is a diagram illustrating a method of displaying a chat message according to a content type.

Referring to FIG. 4, a method of displaying a chat message on the chat preview window may be determined according to the content type of the chat message. For example, if the content type of the chat message is a text type, a speech bubble 410 corresponding to the chat message may be displayed on the chat preview window. The speech bubble 410 may include at least some text included in the chat message. For example, if the size of the text included in the chat message exceeds a threshold size, the text up to the threshold size may be displayed on the speech bubble 410.

For example, if the content type of the chat message is a media file type, an icon corresponding to the chat message may be displayed on the chat preview window. For example, when the content type of the chat message is an image file, an icon 420 corresponding to the chat message may include a thumbnail of the image. For example, when the content type of the chat message is an image file, the icon 420 corresponding to the chat message may include information indicating an image file (e.g., text indicating that the transmitted chat message is an image file or an image replacing the transmitted image file). If a plurality of image files is transmitted, image files up to a threshold quantity/number may be displayed as thumbnails and, for the image files exceeding the threshold quantity/number, the number of image files may be displayed.

For example, if the content type of the chat message is a video file, an icon 430 corresponding to the chat message may include a thumbnail of the video. For example, if the content type of the chat message is a video file, the icon 430 corresponding to the chat message may include information indicating a video file (e.g., text indicating that the transmitted chat message is a video file or an image replacing the transmitted video file). The thumbnail of the video may include a play button to request playback of the video. playback of a video through the chat preview window is set not to be allowed, the play button may be disabled. If the play button is disabled, the video may not play even when an input selecting the play button is received.

For example, if the content type of the chat message is a deleted message type, a speech bubble 440 indicating a deleted message may be displayed on the chat preview window. The speech bubble 440 indicating a deleted message may include text indicating that the chat message is a deleted message, such as "This is a deleted message."

Figure 5:
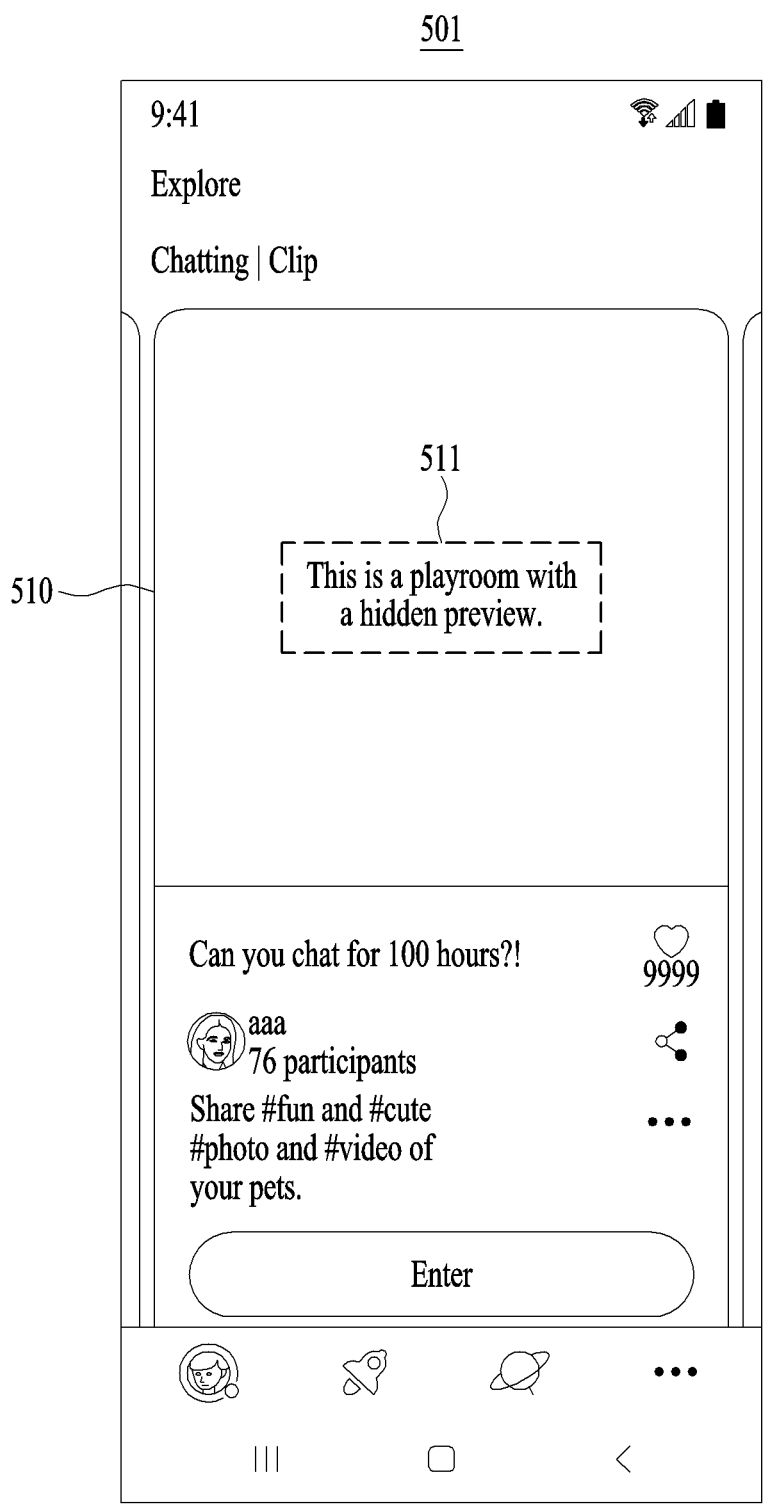
FIG. 5 is a diagram illustrating an example screen of an instant messenger displayed on a terminal when a chat preview restriction is set.

FIG. 5 is a diagram illustrating a screen of an instant messenger displayed on a terminal when a chat preview restriction is set.

Referring to a screen 501 of FIG. 5, if a preview restriction of a chat message is set, the display of a chat message on a chat preview window 510 may be restricted. The chat preview window 510 may display a message 511 indicating that a preview is restricted.

Referring to the screen 501 of FIG. 5, chat room information other than the chat message, such as name information, participant information, and introduction information of the chat room, may be displayed. A display restriction may also be set for chat room information. If the display restriction is set for chat room information, a display of the chat room information for which the display restriction is set may be omitted in a chat room item. For example, if the display restriction is set for participant information of a chat room, the participant information of the chat room corresponding to a focused chat room item may not be displayed through a terminal focusing on the chat room item.

Figure 6:
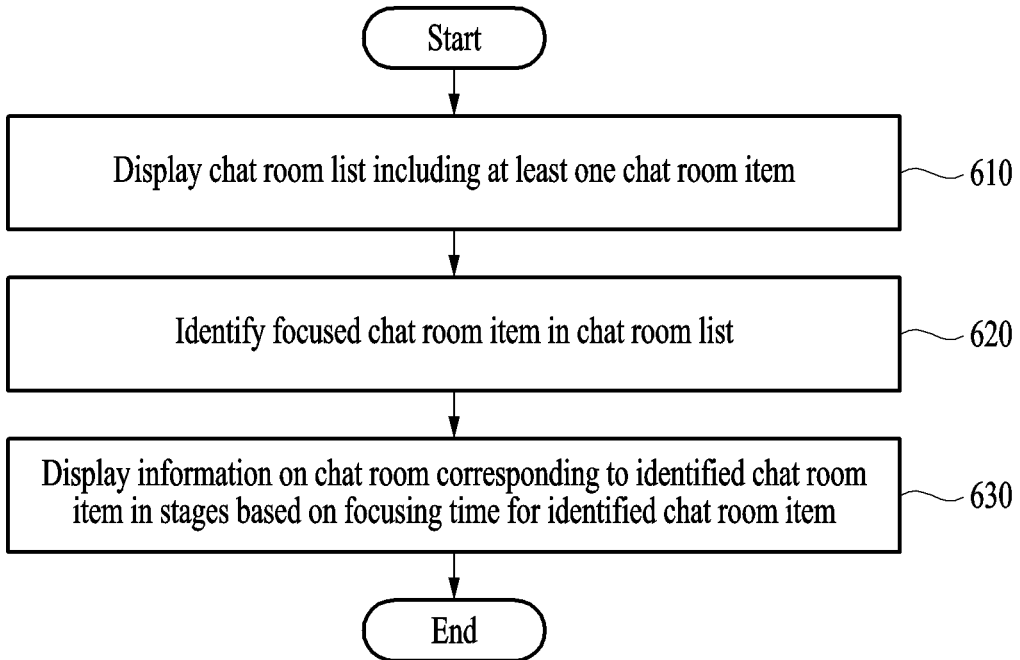
FIG. 6 is a flowchart illustrating an example operation method of an instant messenger.

FIG. 6 is a flowchart illustrating an operation method of an instant messenger.

Referring to FIG. 6, an operation method of an instant messenger may include operation 610 of displaying a chat room list including at least one chat room item. Operation 610 of displaying a chat room list may correspond to operation 110 described above with reference to FIG. 1 and the detailed description thereof will be omitted.

The operation method of an instant messenger may include operation 620 of identifying a focused chat room item in a chat room list. As described above, the focused chat room item may refer to a chat room item that is displayed as a focus on a display of a terminal among chat room items included in the chat room list. For example, a chat room item being displayed on the display among the chat room items included in the chat room list, a chat room item being displayed in the largest area among the chat room items being displayed in the display, and/or a chat room item being displayed in the center area of the display may be identified as the focused chat room item.

The operation method of an instant messenger may include operation 630 of displaying information on a chat room corresponding to the identified chat room item in stages based on a focusing time for the identified chat room item. The information on the chat room may include chat room information and information on a chat message transmitted and received in the chat room. For example, the information on the chat room may include at least one of name information, introduction information, notice information, participant information, chatbot information of the chat room, or information on a chat message transmitted and received in the chat room.

The information on the chat room may be displayed in stages as the focusing time for the chat room item continues. For example, operation 630 of displaying information on a chat room in stages may include providing information corresponding to a first group among pieces of the information on the chat room if the focusing time reaches a first threshold, and providing information corresponding to the first group and a second group among the pieces of the information on the chat room if the focusing time reaches a second threshold value (e.g., "5" seconds). The second threshold value may be a value greater than the first threshold value.

Figure 7A:
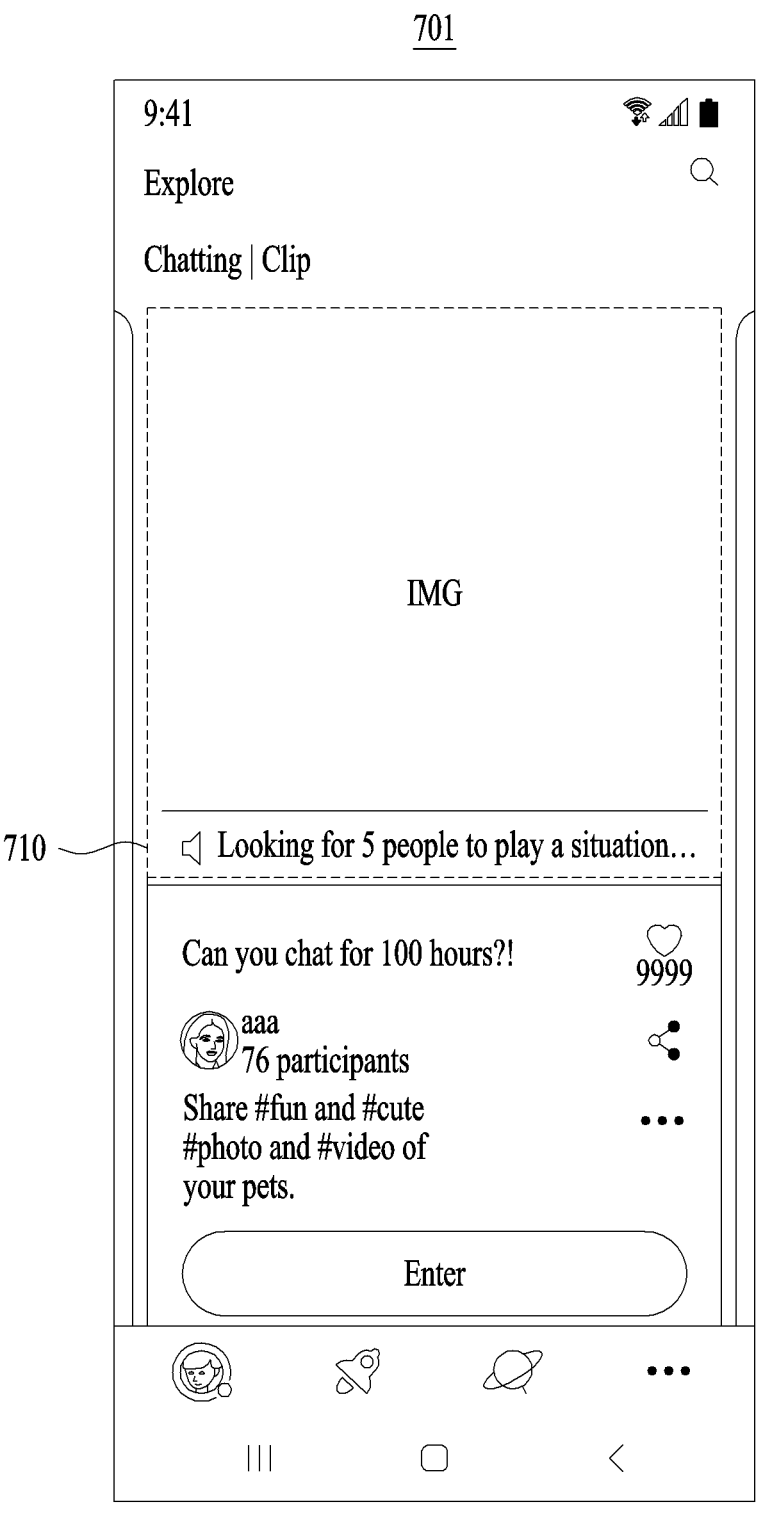
FIGS. 7A and 7B are diagrams illustrating an example operation in which information on a chat room is displayed in stages as a focusing time for a chat room item lasts.
Figure 7B:
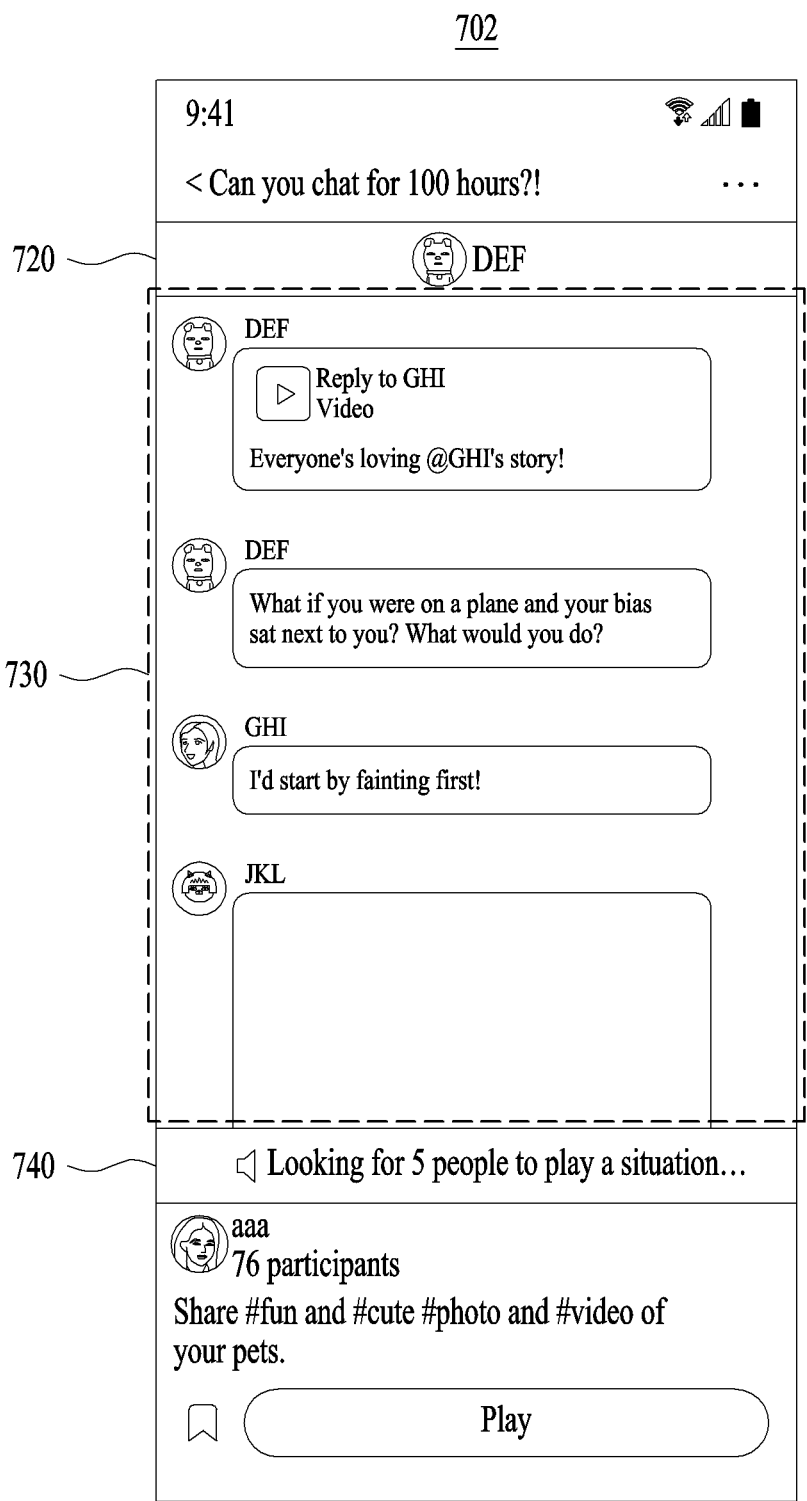

For example, referring to a screen 701 of FIG. 7A, if a focusing time for a determined chat room item reaches a first threshold value (e.g., "2" seconds), notice information 710 designated as a first group among pieces of information on the chat room may be displayed. Referring to a screen 702 of FIG. 7B, if the focusing time subsequently reaches a second threshold value (e.g., "5" seconds), chatbot information 720 and information 730 on a chat message transmitted and received in the chat room, which are designated as a second group, may be displayed in addition to notice information 740 corresponding to the first group.

Some of the information on the chat room may be displayed regardless of the focusing time. For example, among the information on the chat room, name information, introduction information, and participant information of the chat room may be displayed when the chat room item is displayed, regardless of the focusing time.

Figure 8:
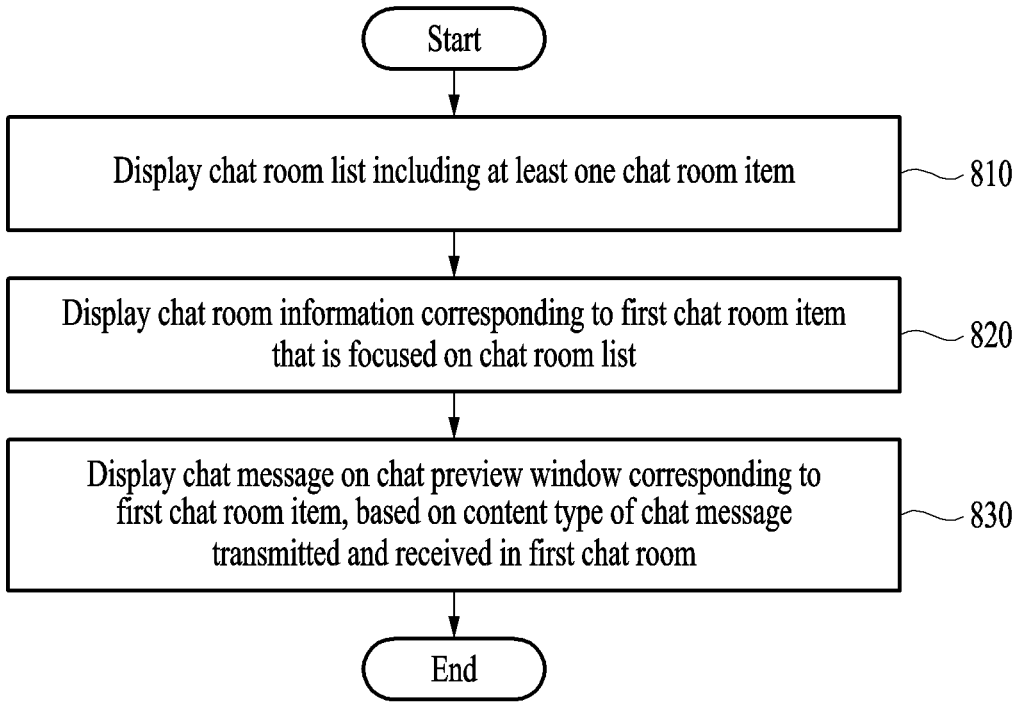
FIG. 8 is a flowchart illustrating an example operation method of an instant messenger.

FIG. 8 is a flowchart illustrating an operation method of an instant messenger.

Referring to FIG. 8, an operation method of an instant messenger may include operation 810 of displaying a chat room list including at least one chat room item and operation 820 of displaying chat room information corresponding to a first chat room item that is focused on the chat room list. The operation 810 may correspond to operation 110 described above with reference to FIG. 1 and the detailed description thereof will be omitted. The operation 820 may correspond to operation 120 described above with reference to FIG. 1 and the detailed description thereof will be omitted.

The operation method of an instant messenger may include operation 830 of displaying, based on a content type of a chat message transmitted and received in a first chat room, the chat message on a chat preview window corresponding to the first chat room item. As described above, the method of displaying a chat message may be determined according to the content type of the chat message.

The operation 830 of displaying a chat message may include displaying a speech bubble corresponding to the chat message when the content type of the chat message is a text type. For example, if the size of text included in the chat message exceeds a threshold size, the text up to the threshold size may be displayed.

The operation 830 of displaying a chat message may include displaying a speech bubble indicating a deleted message when the content type of the chat message is a deleted message type.

The operation 830 of displaying a chat message may include displaying an icon corresponding to the chat message if the content type of the chat message is a media file type. For example, if the content type of the chat message is an image file, an icon corresponding to the chat message may include a thumbnail of the image, text indicating that the transmitted chat message is an image file, and/or an image replacing the transmitted image file. For example, if a plurality of image files is transmitted, image files up to a threshold number may be displayed as thumbnails and, for the image files exceeding the threshold number, the number of image files may be displayed. For example, if the content type of the chat message is a video file, an icon corresponding to the chat message may include a thumbnail of the video, text indicating that the transmitted chat message is a video file, and/or an image replacing the transmitted video file.

The above-described operation method of an instant messenger may be performed on an apparatus executing the instant messenger. The apparatus may include a processor, a memory, and an input/output device (e.g., a touchscreen display, buttons, voice input/output interfaces, image recognition devices, such as cameras, etc.). The apparatus may include, for example, a smartphone, a personal computer (PC), a tablet PC, and the like.

The processor may perform at least one operation included in the operation method of an instant messenger described above with reference to FIGS. 1 to 8. For example, the processor may perform the operation method of an instant messenger described above with reference to FIG. 1, which includes displaying a chat room list including at least one chat room item, displaying chat room information corresponding to a first chat room item that is focused on the chat room list, displaying a chat preview window corresponding to the first chat room item based on a focusing time for the first chat room item, and displaying a chat message transmitted and received in the first chat room on the chat preview window. For example, the processor may perform the operation method of an instant messenger described above with reference to FIG. 6, which includes displaying a chat room list including at least one chat room item, identifying a focused chat room item in the chat room list, and displaying information on a chat room corresponding to an identified chat room item based on a focusing time for the identified chat room item in stages. For example, the processor may perform the operation method of an instant messenger described above with reference to FIG. 8, which includes displaying a chat room list including at least one chat room item, displaying chat room information corresponding to a first chat room item that is focused on the chat room list, and based on a content type of a chat message transmitted and received in the first chat room, displaying the chat message on a chat preview window corresponding to the first chat room item.

The memory may store information related to the operation method of an instant messenger or information necessary to perform the operation method of an instant messenger. The memory may be a volatile memory or a non-volatile memory.

According to an aspect, the apparatus may be connected to an external device (e.g., a PC or a network) through the input/output device and may exchange data with the external device. For example, the apparatus may receive a user input through the input/output device and output data according to the operation of an instant messenger.

The memory may store a program implementing the operation method of an instant messenger described above. The processor may execute the program stored in the memory and control the apparatus. Code of the program executed by the processor may be stored in the memory.

According to an aspect, there is provided an operation method of an instant messenger including displaying a chat room list comprising at least one chat room item, displaying chat room information corresponding to a first chat room item that is focused on the chat room list, displaying a chat preview window corresponding to the first chat room item based on a focusing time for the first chat room item, and displaying a chat message transmitted and received in a first chat room on the chat preview window.

The operation method may further include, in response to an input that moves focus to a second chat room item, displaying chat room information corresponding to the second chat room item.

The displaying of the chat message may include displaying a preset number of recently transmitted and received chat messages among chat messages transmitted and received in the first chat room.

The displaying of the chat message may include displaying a chat message predetermined to be exposed through the chat preview window.

The displaying of the chat message may include at least one of updating a display of the chat message on the chat preview window based on transmission and reception of data in the first chat room, updating the display of the chat message on the chat preview window based on a change in a preview setting of the first chat room, and updating the display of the chat message on the chat preview window at determined intervals.

The displaying of the chat message may include displaying the chat message based on a content type of the chat message.

The displaying of the chat message may include at least one of displaying a speech bubble corresponding to the chat message when a content type of the chat message is a text type, displaying a speech bubble indicating a deleted message when the content type of the chat message is a deleted message type, and displaying an icon corresponding to the chat message when the content type of the chat message is a media file type.

The displaying of the chat message may include displaying profile information of a user who sent the chat message displayed on the chat preview window.

The chat room information may include at least one of name information, introduction information, notice information, participant information, or chatbot information of the chat room.

The displaying of the chat message may include restricting a display of the chat message when a preview restriction of the chat message is set.

According to an aspect, there is provided an operation method of an instant messenger including displaying a chat room list comprising at least one chat room item, identifying a focused chat room item in the chat room list, and displaying information on a chat room corresponding to the identified chat room item based on a focusing time for the identified chat room item in stages.

The displaying of the information on the chat room in stages may include providing information corresponding to a first group among pieces of information on the chat room when the focusing time reaches a first threshold value and providing the information corresponding to the first group and information corresponding to a second group among the pieces of information on the chat room when the focusing time reaches a second threshold value, wherein the second threshold value may be a value greater than the first threshold value.

The information on the chat room may include at least one of name information, introduction information, notice information, participant information, chatbot information of the chat room, or information on a chat message transmitted and received in the chat room.

According to an aspect, there is provided an operation method of an instant messenger including displaying a chat room list comprising at least one chat room item, displaying chat room information corresponding to a first chat room item that is focused on the chat room list, and based on a content type of a chat message transmitted and received in a first chat room, displaying the chat message on a chat preview window corresponding to the first chat room item.

The displaying of the chat message may include at least one of displaying a speech bubble corresponding to the chat message when the content type of the chat message is a text type, displaying a speech bubble indicating a deleted message when the content type of the chat message is a deleted message type, and displaying an icon corresponding to the chat message when the content type of the chat message is a media file type.

According to an aspect, there is provided an apparatus for executing an instant messenger including a processor, which is configured to display a chat room list comprising at least one chat room item, display chat room information corresponding to a first chat room item that is focused on the chat room list, display a chat preview window corresponding to the first chat room item based on a focusing time for the first chat room item, and display a chat message transmitted and received in a first chat room on the chat preview window.

The processor may be configured to, in response to an input that moves focus to a second chat room item, display chat room information corresponding to the second chat room item.

When displaying the chat message, the processor may be configured to update a display of the chat message on the chat preview window based on transmission and reception of data in the first chat room, update the display of the chat message on the chat preview window based on a change in a preview setting of the first chat room, and update the display of the chat message on the chat preview window at determined intervals.

When displaying the chat message, the processor may be configured to display the chat message based on a content type of the chat message.

According to an aspect, there is provided an apparatus for executing an instant messenger including a processor, which is configured to display a chat room list comprising at least one chat room item, identify a focused chat room item in the chat room list, and display information on a chat room corresponding to the identified chat room item based on a focusing time for the identified chat room item in stages.

When displaying information on the chat room in stages, the processor may be configured to provide information corresponding to a first group among pieces of information on the chat room when the focusing time reaches a first threshold value and provide the information corresponding to the first group and information corresponding to a second group among the pieces of information on the chat room when the focusing time reaches a second threshold value, wherein the second threshold value may be a value greater than the first threshold value.

According to an aspect, there is provided an apparatus for executing an instant messenger including a processor, which is configured to display a chat room list comprising at least one chat room item, display chat room information corresponding to a first chat room item that is focused on the chat room list, and based on a content type of a chat message transmitted and received in a first chat room, display the chat message on a chat preview window corresponding to the first chat room item.

The features described herein may be implemented using a hardware component, a software component, and/or a combination thereof. For example, a processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the processing device is described as singular. However, one of ordinary skill in the art will appreciate that a processing device may include multiple processing elements and/or multiple types of processing elements. For example, the processing device may include a plurality of processors, or a single processor and a single controller. In addition, a different processing configuration is possible, such as one including parallel processors.

The software may include a computer program, a piece of code, an instruction, or one or more combinations thereof, to independently or collectively instruct and/or configure the processing device to operate as desired. Software and data may be embodied permanently or temporarily in any type of machine, component, physical or virtual equipment, or computer storage medium or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods, operations, and/or algorithms described herein may be recorded in non-transitory computer-readable media including program instructions to implement various operations described herein. The media may also include the program instructions, data files, data structures, and the like alone or in combination. The program instructions recorded on the media may be those specially designed and constructed for the purposes of illustrated features, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random-access memory (RAM), flash memory, and the like. Examples of program instructions include both machine code, such as those produced by a compiler, and files containing high-level code that may be executed by the computer using an interpreter.

The above-described hardware devices may be configured to act as one or more software modules in order to perform the operations of the above-described embodiment(s), or vice versa.

Although various examples have been described with reference to the illustrative drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. An apparatus configured to execute an instant messenger application and automatically generate previews of chat rooms via the instant messenger application, the apparatus comprising:

a display configured to receive at least one user input;

a communication interface;

one or more processors; and memory storing instructions that, when executed by the one or more processors, cause the apparatus to:

receive, by the apparatus executing the instant messenger application and from a server via a network, data corresponding to at least one chat room;

display, based on the data and in a user interface of the instant messenger application, a chat room list comprising an indication of the at least one chat room;

in response to receiving, via the user interface, a user input that controls at least a portion of the chat room list to be output through the display, identify, from the chat room list, that a first chat room is focused, based on at least one of a size and a position of a region in which the first chat room is displayed on the display;

display, via the user interface, chat room information that comprises metadata corresponding to the first chat room, based on a duration of focusing on the first chat room; and based on a determination that the duration of focusing on the first chat room satisfies a threshold:

display, via the user interface and during display of the chat room information, a chat preview window corresponding to the first chat room; and display, in the chat preview window, at least one chat communication occurred in the first chat room.

2. The apparatus of claim 1, wherein the instructions, when executed by the one or more processors, cause the apparatus to display the chat room information by:

in response to focusing being changed from the first chat room to a second chat room within the chat room list before the duration of focusing on the first chat room reaches a threshold, displaying, via the user interface, the chat room information that comprises metadata corresponding to the second chat room, based on a duration of focusing on the second chat room.

3. The apparatus of claim 1, wherein the instructions, when executed by the one or more processors, cause the apparatus to display the at least one chat communication by:

determining whether the at least one chat communication is approved for display in the chat preview window; and based on a determination that the at least one chat communication is approved for display in the chat preview window, displaying the at least one chat communication in the chat preview window.

4. The apparatus of claim 1, wherein the instructions, when executed by the one or more processors, cause the apparatus to display the at least one chat communication by causing the apparatus to update display, in the user interface, of the at least one chat communication based on one or more of:

transmission and reception of data in the first chat room;

a change in a preview setting of the first chat room; or a determination that a predetermined time interval has elapsed.

5. The apparatus of claim 1, wherein the instructions, when executed by the one or more processors, cause the apparatus to display the at least one chat communication by:

displaying at least one chat message based on a content type of the at least one chat communication, and wherein the instructions, when executed by the one or more processors, cause the apparatus to display the at least one chat communication by displaying one or more of:

a speech bubble corresponding to the at least one chat communication when a content type of the at least one chat communication is a text type;

a speech bubble indicating a deleted message when the content type of the at least one chat communication is a deleted message type; or an icon corresponding to the at least one chat communication when the content type of the at least one chat communication is a media file type.

6. The apparatus of claim 1, wherein the chat room information comprises one or more of:
name information of the first chat room,
introduction information of the first chat room,
notice information of the first chat room,
participant information of the first chat room, or
chatbot information of the first chat room.

7. The apparatus of claim 1, wherein the instructions, when executed by the one or more processors, cause the apparatus to display the chat room information by:
in response to a focusing duration on the first chat room reaching a first threshold, displaying, via the user interface, the chat room information that comprises a first metadata group among the metadata corresponding to the first chat room; and
in response to the focusing duration on the first chat room reaching a second threshold that is greater than the first threshold, displaying, via the user interface, the chat room information that comprises the first metadata group and a second metadata group among the metadata corresponding to the first chat room.

8. The apparatus of claim 7, wherein the first metadata group comprises at least one of name information, introduction information, notice information, or participant information of the first chat room, the first metadata group being displayed in a first region in which the first chat room is displayed, and
wherein the second metadata group comprises at least one of information indicating at least one chatbot activated in the first chat room or chat message information transmitted and received in the first chat room, the second metadata group being displayed in a second region in which the first chat room is displayed.

9. A method for automatically generating previews of chat rooms via an instant messenger application, the method comprising:
receiving, by a computing device executing the instant messenger application and from a server via a network, data corresponding to at least one chat room;
displaying, by the computing device, based on the data, and in a user interface of the instant messenger application, a chat room list comprising an indication of the at least one chat room;
in response to receiving, by the computing device and via the user interface, a user input that controls at least a portion of the chat room list to be output through the display, identifying, from the chat room list, that a first chat room is focused, based on at least one of a size and a position of a region in which the first chat room is displayed on the display;
displaying, via the user interface, chat room information that comprises metadata corresponding to the first chat room, based on a duration of focusing on the first chat room; and
based on a determination that the duration of focusing on the first chat room satisfies a threshold:
displaying, by the computing device, via the user interface, and during display of the chat room information, a chat preview window corresponding to the first chat room; and
displaying, by the computing device and in the chat preview window, at least one chat communication occurred in the first chat room.

10. The method of claim 9, wherein the displaying the chat room information comprises:
in response to focusing being changed from the first chat room to a second chat room within the chat room list before the duration of focusing on the first chat room reaches a threshold,
displaying, via the user interface, the chat room information that comprises metadata corresponding to the second chat room, based on a duration of focusing on the second chat room.

11. The method of claim 9, wherein the displaying the at least one chat communication comprises:
determining a preset number of chat messages among chat messages communicated in the first chat room; and
displaying, in the chat preview window, the preset number of chat messages.

12. The method of claim 9, wherein the displaying the at least one chat communication comprises:
determining whether the at least one chat communication is approved for display in the chat preview window; and
based on a determination that the at least one chat communication is approved for display in the chat preview window, displaying the at least one chat communication in the chat preview window.

13. The method of claim 9, wherein the displaying the at least one chat communication comprises updating display, in the user interface, of the at least one chat communication based on one or more of:
transmission and reception of data in the first chat room;
a change in a preview setting of the first chat room; or
a determination that a predetermined time interval has elapsed.

14. The method of claim 9, wherein the displaying the at least one chat communication comprises:
displaying at least one chat message based on a content type of the at least one chat communication.

15. The method of claim 9, wherein the displaying the at least one chat communication comprises one or more of:
displaying a speech bubble corresponding to the at least one chat communication when a content type of the at least one chat communication is a text type;
displaying a speech bubble indicating a deleted message when the content type of the at least one chat communication is a deleted message type; or
displaying an icon corresponding to the at least one chat communication when the content type of the at least one chat communication is a media file type.

16. The method of claim 9, wherein the displaying the at least one chat communication comprises:
displaying, via the user interface, profile information of a user who sent the at least one chat communication; or
displaying, via the user interface, notice information of the first chat room.

17. The method of claim 9, wherein the chat room information comprises one or more of:
name information of the first chat room,
introduction information of the first chat room,
notice information of the first chat room,
participant information of the first chat room, or
chatbot information of the first chat room.

18. The method of claim 9, wherein the displaying the chat room information comprises:
in response to a focusing duration on the first chat room reaching a first threshold, displaying, via the user interface, the chat room information that comprises a first metadata group among the metadata corresponding to the first chat room; and in response to the focusing duration on the first chat room reaching a second threshold that is greater than the first threshold, displaying, via the user interface, the chat room information that comprises the first metadata group and a second metadata group among the metadata corresponding to the first chat room.

19. The method of claim 18, wherein the first metadata group comprises at least one of name information, introduction information, notice information, or participant information of the first chat room, the first metadata group being displayed in a first region in which the first chat room is displayed, and wherein the second metadata group comprises at least one of information indicating at least one chatbot activated in the first chat room or chat message information transmitted and received in the first chat room, the second metadata group being displayed in a second region in which the first chat room is displayed.

20. A non-transitory computer-readable storage medium storing instructions that, when executed by a processor, cause the processor to perform the method of claim 9.

* * * * *